US006857193B2

(12) United States Patent
Kallesen et al.

(10) Patent No.: US 6,857,193 B2
(45) Date of Patent: Feb. 22, 2005

(54) LOCATION PROJECTOR APPARATUS AND METHODS

(76) Inventors: Darryl H. Kallesen, 22023 S. Monte Carlo, Oregon City, OR (US) 97045; Teddy L. Reynolds, 23233 S. Ridge Rd., Beaver Creek, OR (US) 97004

( * ) Notice: Subject to any disclaimer, the term of this patent is extended or adjusted under 35 U.S.C. 154(b) by 701 days.

(21) Appl. No.: 09/969,747

(22) Filed: Oct. 2, 2001

(65) Prior Publication Data

US 2002/0038513 A1 Apr. 4, 2002

Related U.S. Application Data

(60) Provisional application No. 60/237,502, filed on Oct. 4, 2000.

(51) Int. Cl.[7] .............................................. G01B 11/26
(52) U.S. Cl. .................................. 33/286; 33/DIG. 21
(58) Field of Search .............................. 33/263, 275 R, 33/286, 520, 529, 574, DIG. 21

(56) References Cited

U.S. PATENT DOCUMENTS

| | | | | |
|---|---|---|---|---|
| 3,168,783 A | * | 2/1965 | Morehead ..................... | 33/520 |
| 3,824,666 A | * | 7/1974 | Roodvoets et al. ........... | 33/286 |
| 5,782,006 A | * | 7/1998 | Erway et al. .................. | 33/520 |
| 5,836,081 A | * | 11/1998 | Orosz, Jr. ................. | 33/DIG. 21 |
| 6,096,049 A | * | 8/2000 | Lewis et al. .................. | 33/286 |
| 6,124,935 A | * | 9/2000 | Matthews ..................... | 33/286 |
| 6,151,788 A | * | 11/2000 | Cox et al. ..................... | 33/286 |
| 6,371,626 B1 | * | 4/2002 | Addona ......................... | 33/520 |
| 6,427,348 B1 | * | 8/2002 | Webb ............................ | 33/286 |
| 6,532,676 B2 | * | 3/2003 | Cunningham ................. | 33/286 |
| 2002/0038513 A1 | * | 4/2002 | Kallesen et al. .............. | 33/286 |
| 2002/0066191 A1 | * | 6/2002 | Hsu ............................... | 33/286 |

* cited by examiner

*Primary Examiner*—G. Bradley Bennett
(74) *Attorney, Agent, or Firm*—Schwabe, Williamson & Wyatt, P.C.

(57) ABSTRACT

Apparatus and methods are provided which are particularly useful in determining the location for producing aligned holes or hangers in consecutive support members such as joists from which pipe, conduit, wire, duct, and the like, will be supported, with the minimum amount of measuring or errors in measurements. The present invention includes an instrument that houses a small diameter light beam projector, e.g., a laser light beam projector, that is provided with the ability to adjust the direction of beam projection from the instrument relative to its housing. The instrument is adapted to fit through a pre-bored hole or a hanging support so as to direct the laser light beam into the desired direction to locate additional bored holes or hangers. The projected beam position is checked and if there is error, the projector is adjusted within the instrument housing to properly place the beam center at the desired location with respect to second joist. In the case of a through hole, the second hole is drilled and the beam passes through the second hole to the third joist. The beam now accurately identifies the location for the third hole to be drilled and the procedure continues through the joists to the desired termination of the conduit.

17 Claims, 6 Drawing Sheets

LOCATION PROJECTOR APPARATUS AND METHODS

RELATED APPLICATIONS

This application claims the benefit of U.S. Provisional Application Ser. No. 60/237,502, filed Oct. 4, 2000.

FIELD OF THE INVENTION

This invention pertains to apparatus and methods to aid in the production or placement of aligned holes or supports through or along multiple support beams or joists in a building structure to enable placement of straight rigid conduit for use, e.g., as water lines, stringing of electrical wire and the like.

BACKGROUND OF INVENTION

In a building structure, water, electricity and venting need to be available at different locations in the building. Wire conveying conduit, water pipes and vent ducts are typically provided in the walls and flooring of the building structures. Such spaces also are occupied by support members such as beams or joists and it is frequently necessary to direct such conduit, pipes and the like either through the joists or hung from below the joists as the pipes are extended, e.g., from one side of the building to the other.

In order to properly place the conduit and the like, the builder commonly provides a series of aligned through holes within the joists or aligned hangers below the joists. Misalignment of the through holes or hangers results in considerable re-measuring and rework. The builder typically locates a first hole or hanger in a joist, for example, by measuring from a common reference, such as the floor and adjoining wall. The builder continues this measuring process with subsequent joists along the desired path. Measurement of each hole or hanger is a time and labor intensive operation. Misalignment of even a single hole or hanger will prevent the proper placement of the conduit. In joists, a misaligned through hole may require that the through hole be reworked, possibly requiring the repair or replacement of the joist.

There is a need for apparatus and methods to replace the labor intensive and costly production of aligned holes and hangers in spaced-apart structures that is less complex and labor intensive, while reducing the potential for misalignment.

SUMMARY OF INVENTION

The present invention includes an instrument that houses a small diameter light beam projector, e.g., a laser light beam projector, that is provided with the ability to adjust the direction of beam projection from the instrument relative to its housing. The instrument is adapted to fit through a pre-bored hole in a support joist and to be securely clamped to the joist so as to direct the laser light beam onto an adjacent support joist. The projection of the light beam onto the adjacent joist is intended to identify the center of the hole to be bored in the adjacent or second joist. The projected beam position is checked and if there is error, the projector is adjusted within the instrument housing to properly place the beam center at the desired hole center for the second joist. The second hole is drilled and the beam passes through the second hole to the third joist. The beam now accurately identifies the location for the third hole to be drilled and the procedure continues through the joists to the desired termination of the conduit.

Clamping of the instrument to the first joist is important, as is the ability to adjust the beam projection. Cross hairs may be provided on the projector lens to pinpoint the beam center. Because there are different hole sizes, the instrument is either adapted to adjust to the different hole sizes or adjusting sleeves are provided to adapt projector to the hole. These and other variations as well as the invention itself will become more readily apparent upon reference to the following detailed description that follows.

DESCRIPTION

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

The following embodiments and figures refer to a laser used as an illuminating source. The scope of the invention is not to be limited to lasers. The scope of the invention includes, but is not limited to, any illuminating source or apparatus suitable for the intended purpose.

Figure 1A:
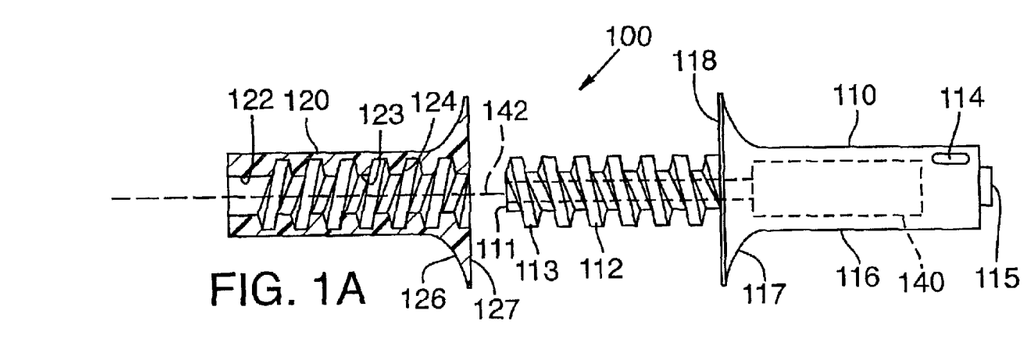
FIGS. 1A and 1B are partial cross-sectional side exploded and assembled views, respectively, of a location projector in accordance with an embodiment of the invention.
Figure 1B:
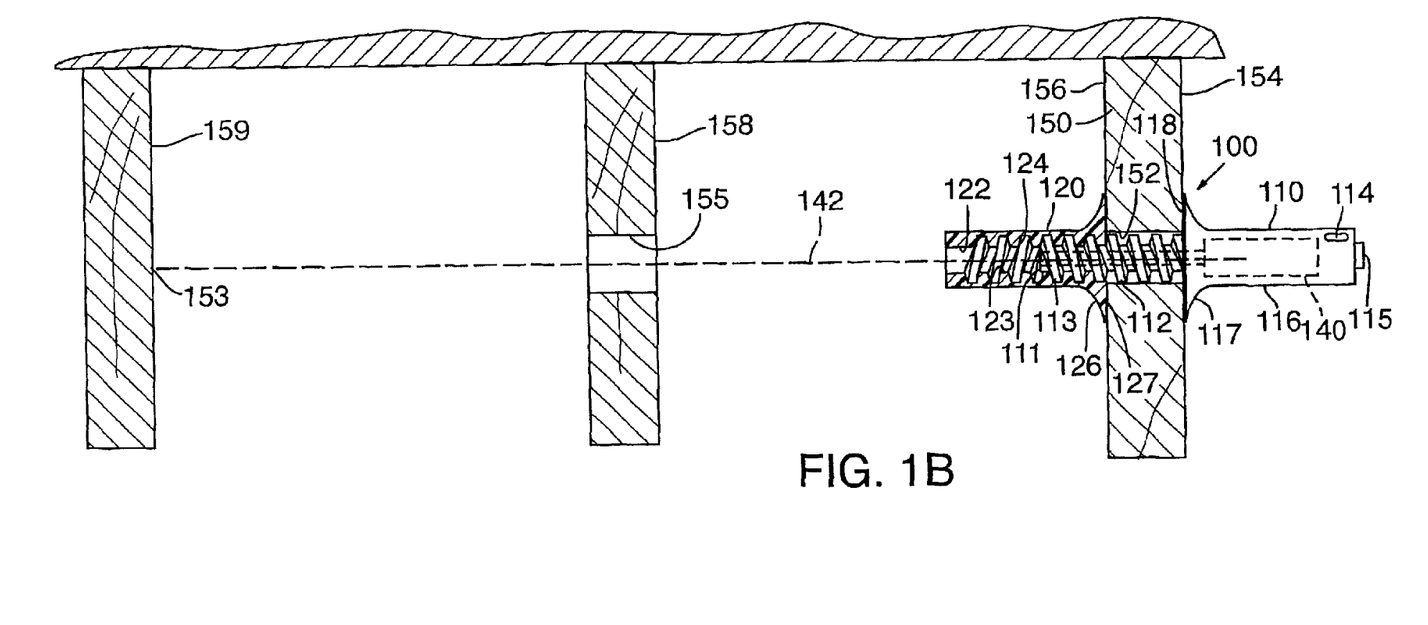

FIG. 1A is a partial cross-sectional exploded side view of a location projector 100 in accordance with an embodiment of the present invention. FIG. 1B is a partial cross-sectional assembled side view of the location projector 100 in accordance with the method of using the embodiment of FIG. 1A. The location projector 100 comprises a first portion 110 and a second portion 120 adapted to be coupled together through a first through bore 152 in a first support member 150 and, as coupled, to be securely clamped to the first support member 150.

The first portion 110 comprises a cylindrical first end 111 having external helical threads 112. The first end 111 is adapted to be inserted into the first through bore 152 from a first side 154 of the first support member 150. The length of the first end 111 is adapted to be longer than the length of the first through bore 152 such that when inserted into the first through bore 152, at least a portion 113 of the first end 111 extends beyond an opposite side 156 of the support member 150. The first portion 110 further comprises a second end 116. The second end 116 has a first enlarged portion 117 adapted to prevent the second end 116 from entering the first through bore 152. The first enlarged portion 117 comprises a flat first contact surface 118.

The second portion 120 comprises a second portion through bore 122, wherein at least a portion of which comprises internal helical threads 124. The internal threads 124 are adapted to accept the external threads 112 of the first end 111. The second portion 120 further comprises a second enlarged portion 126 adapted to prevent the second portion 120 from entering the first through bore 152. The second enlarged portion 126 comprises a flat second contact surface 127.

The first portion 110 further comprises a laser projector 140. The laser projector 140 produces a light beam 142 that exits the first end 111 of the first portion 110 in substantially coaxial alignment with the first end 111.

Referring again to FIG. 1B, the first support member 150, such as a joist or a beam, among others, is measured to locate and produce the first through bore 152 using conventional methods. The location projector 100 is coupled to the first support member 150 through the first through bore 152 in such a way as to project the light beam 142 along the desired path to locate positions on adjacent support members to produce subsequent through bores.

The first end 111 is inserted into the first through bore 152 from the first side 154 of the first support member 150, with the flat first contact surface 118 abutting the first side 154. From the opposite side 156 of the first support member 150, the second portion 120 is threaded onto the portion 113 of the first end 111 that extends beyond the first through bore 152. The second portion 120 is advanced such that the flat second contact surface 127 of the second enlarged portion 126 abuts the opposite side 156 of the first support member 150. In cooperation with the first contact surface 118, the second contact surface 127 applies clamping engagement with the first support member 150. This clamping engagement of the first and second contact surfaces 118, 127 against the first and opposite sides 154,156, respectively, of the first support member 150, firmly couples the location projector 100 to the first support member 150. Thus, the light beam 142 of the laser projector 140 is substantially perpendicular to the support member first and opposite sides 154,156 and substantially coaxial with the first through bore 152. This position of the light beam 142 may be used as a reference for subsequent light beam positioning.

The laser projector 140 projects a light beam 142 through the second portion through bore 122 of the second portion 120 to illuminate a location on a second support member 158 which is adjacent to the first support member 150. The impingement point 153 of the light beam 142 onto the second support member 158 can therefore be marked for producing a through bore on the second support member 158. The impingement point 153 may then be measured in relation to the second support member 158 to ensure that the impingement point 153 is correctly placed.

The position of the light beam 142 is adapted to be adjustable. The adjustment may be made using a variety of apparatus. In an embodiment of a location projector 100 with a position apparatus (not shown), the position of the location projector 100 relative to the first through bore 152 is adjusted using a vernier. A vernier is defined here as an auxiliary device used with a main device to obtain fine adjustment. In another embodiment (not shown), the positioning apparatus includes optics that is used to focus and adjust the position of the light beam 142. One skilled in the use of lasers will recognize numerous method of adjusting the position of a light beam with respect to a device in which it is mounted.

The adjustment of the light beam 142 may be used to compensate for placement errors of the location projector 100 within the first through bore 152. Further, the adjustment may also be used to adjust the beam off the axis of the first through bore 152 to a desired angle. An off-axis angle may be useful for, for example, but not limited to, defining locations for subsequent placement of a gravity-fed drainage pipe. Such a drainage pipe may require, for example, a downwardly sloping mounting such that a downwardly sloping alignment of through bores would be desired.

In another embodiment in accordance with the present invention, the location projector 100 her comprises a horizontal bubble-level 114. The bubble-level 114 is in alignment with the axis of the light beam 142. The bubble-level 114 provides a visual indication of the horizontal condition of the light beam 142. In another embodiment, or in addition to the aforementioned embodiments, the location projector 100 further comprises a bulls-eye bubble indicator 115. The bulls-eye bubble indicator 115 provides a visual indication of the vertical condition of the light beam 142. It is within the scope of the invention that the location of the bubble-level 114 and the bulls-eye bubble indicator 115 may be placed on either the first or second portion 110,120 in a location suitable for the intended purpose.

Once the impingement point 153 of the light beam 142 on the second support member 158 is correctly placed and marked, the mark is used to produce a second through bore 152 in the second support member 158 which will be aligned with the first through bore 152.

After the second through bore 155 is made in the second support member 158, the light beam 142 will project through the second through bore 152 to illuminate an impingement location 153 on a subsequent support member 159 into which an aligned through bore may be produced. Measurement of the impingement location of the light beam 142 is not needed beyond the second support member 158 in order to accurately produce through bores which are aligned with the first through bore 152. This method is sequentially repeated until the desired number of aligned through bores is made.

It is anticipated that for some applications, the diameter of the first end 111 will be substantially smaller than the diameter of the first through hole 152. In such cases, the location projector 100 may be susceptible to shifting within the first through bore 152. Shifting can be caused by, for example, construction shock and vibration, as well as holding the location projector 100 centered within the through hole 152 when clamped. Therefore, the invention includes embodiments for apparatus and methods for compensating for this mismatch.

Figure 2A:
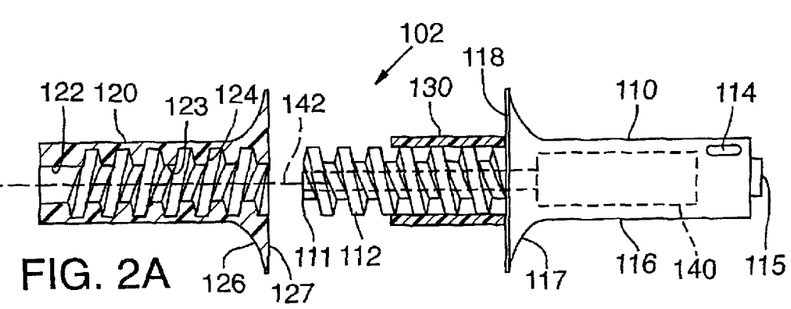
FIGS. 2A and 2B are partial cross-sectional side exploded and assembled views, respectively, of a location projector in accordance with an embodiment of the invention.
Figure 2B:
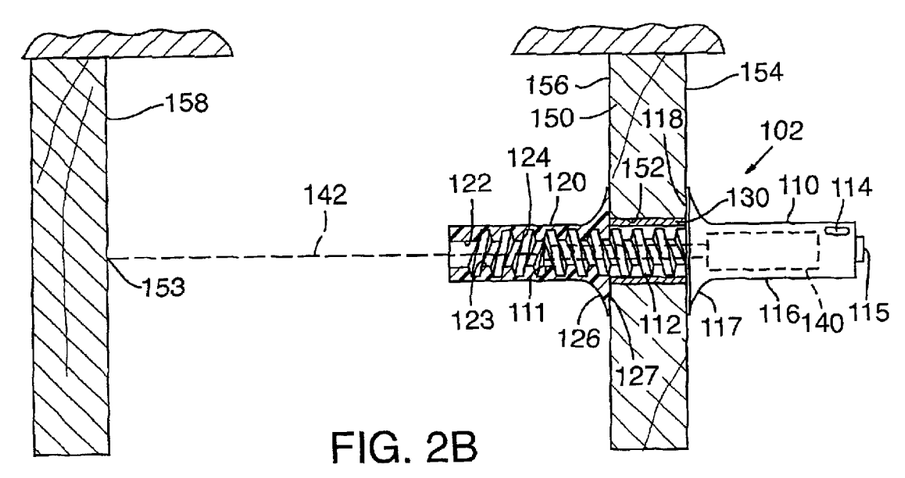

FIG. 2A is a partial cross-sectional exploded side view of a location projector 102 in accordance with an embodiment of the present invention. FIG. 2B is a partial cross-sectional assembled side view of the location projector 102 in accordance with the method of using the embodiment of FIG. 2A. The location projector 102 comprises essentially the same elements as the embodiment of FIGS. 1A and 1B with the addition of a sleeve 130. The sleeve 130 is sized to adapt the diameter of the first end 111 to the diameter of the first through bore 152 such that the location projector 102 is substantially centered and restricted from shifting within the first through bore 152. That is, the interior diameter of the sleeve 130 is substantially the same as the diameter of the first end 111, and the exterior diameter of the sleeve 130 is substantially the same as the diameter of the first through bore 152.

During assembly, the sleeve 130 is slipped over the first end 111 such that an end of the sleeve 130 abuts the first contact surface 118 of the first portion 110. The sleeve 130 has a length substantially equal to the depth of the first through bore 152. Once the first end 111 and the sleeve 130 are inserted into the first through bore 152, the second portion 120 is advanced onto the first end 111 in substantially the same method as previously discussed. The sleeve 130 will be contained within the first through bore 152 and will not interfere with the clamping engagement of the first and second contact surfaces 118,127 and the first support member 150.

In another embodiment of the invention, not shown, the sleeve 130 is adapted to be compressible. The sleeve 130 has a length greater than the depth of the first through bore 152. In an embodiment of the method, the sleeve 130 is advanced over the first end 111 with an end abutting the first contact surface 118. The first end 111 and the sleeve 130 are inserted into the first through bore 152. The second portion 120 is threaded onto the first end 111 and advanced such that the second contact surface 126 abuts the sleeve 130.

Upon further advancement of the second portion 120, the sleeve 130 is confined between the first and second contact surfaces 118, 127 causing the sleeve 130 to compress lengthwise and expand and/or increase in diameter. The sleeve 130 is adapted to radially expand against at least a portion of the inside surface of the first through bore 152. The sleeve 130 bears against the inside of the first through bore 152 and against the first end 111 securing and centering the location projector 102 inside the first through bore 152. Further tightening of the second portion 120 causes the first and second contact surfaces 118, 127 to abut and apply clamping pressure to the first and opposite sides 154,156 of the first support member 150 in substantially the same way as the previous embodiment.

Figure 3A:
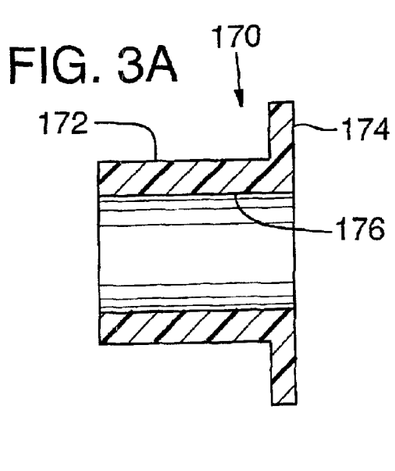
FIGS. 3A and 3B are cross-sectional side and end views, respectively, of a location projector hole adapter, in accordance with an embodiment of the invention.
Figure 3B:
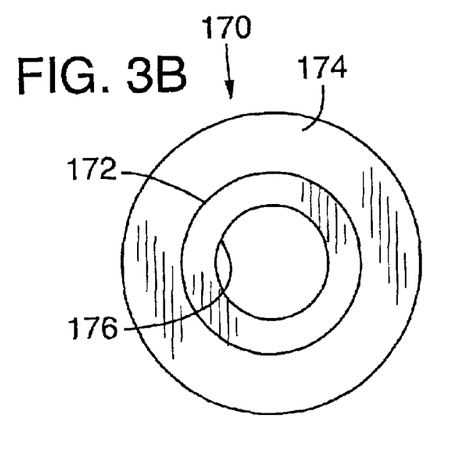
Figure 3C:
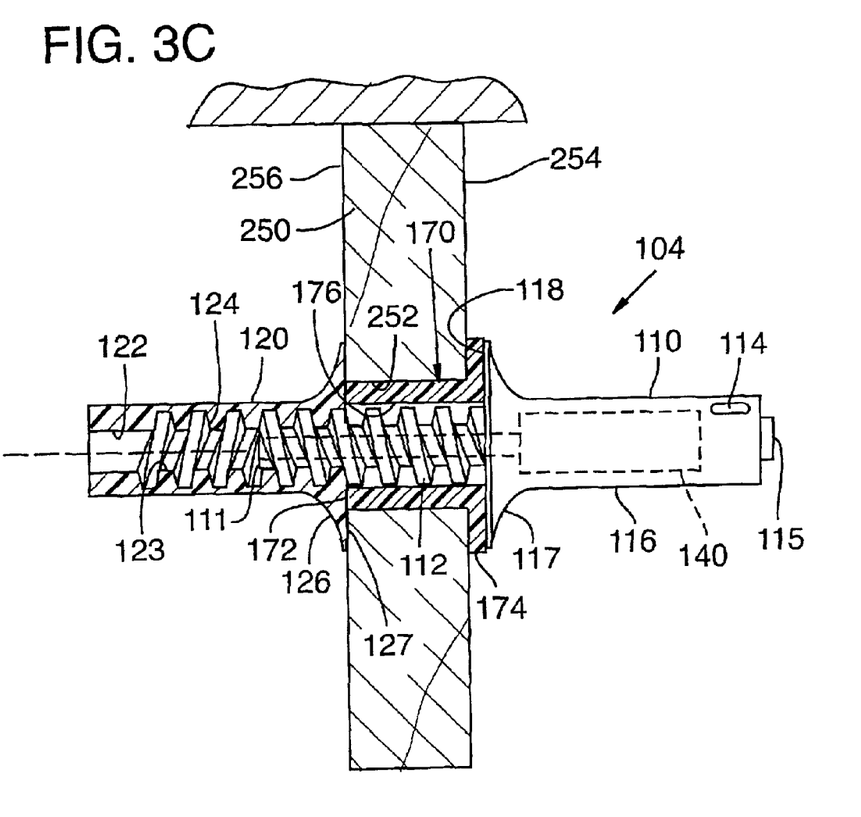
FIG. 3C is a partial cross-sectional side view of a location projector with hole adapter, in accordance with an embodiment of the invention.

FIGS. 3A and 3B are cross-sectional side and end views, respectively, of a through bore adapter 170, in accordance with an embodiment of the invention. FIG. 3C is a partial cross-sectional side view of the location projector 104 comprising the through bore adapter 170 in accordance with the method of using the embodiment of FIGS. 3A and 3B. The through bore adapter 170 comprises a flange 174 and a cylindrical portion 172. The cylindrical portion 172 has an outside diameter substantially the same as the inside diameter of a first through bore 252 in a first support member 250 into which it is placed. The through bore adapter 170 includes an adapter through bore 176. The adapter through bore 176 is substantially the same as the diameter of the first end 111.

The cylindrical portion 172 of the through bore adapter 170 has a length adapted to span at least a portion of the depth of the first through bore 252. The flange 174 of the through bore adapter 170 is adapted to rest adjacent a first side 254 of the first support member 250.

The first portion 110 and the second portion 120 is substantially the same as in previous embodiments.

In an embodiment of the method of the present invention, the cylindrical portion 172 of the through bore adapter 170 is inserted into the first through bore 252 in the first support member 250 with the flange 174 abutting the first side 254. The first end 111 is inserted into the adapter bore 176 with the first contact surface 118 abutting the flange 174. The second portion 120 is advanced onto the first portion 111 in substantially the same method as previously discussed.

The first and second contact surfaces 118, 127 applies clamping engagement with the flange 174 of the through bore adapter 170 and the opposite side 256, respectively, firmly securing the location projector 104 to the first support member 250. By this method, the location projector 104 is substantially centered within the through bore 252 and is removably coupled to the first support member 250.

Through bore adapters of various diameters and lengths are within the scope of the present invention to adapt the location projector 104 to many different through bore sizes and support member widths. Additionally, it is within the scope of the invention that the through bore adapter 170 can be used in combination with the sleeve 130 such as shown in the embodiment of FIG. 2A, if needed.

In the previous embodiments, the laser projector 140 is contained within the first portion 110 of the location projector 100, 102, 104, with the light beam 142 exiting the first end 111. In other embodiments within the scope of the invention (not shown), the laser projector 140 is located on the second portion 120. Further, in other embodiments, the laser projector is a removable component of the location projector.

Figure 4A:
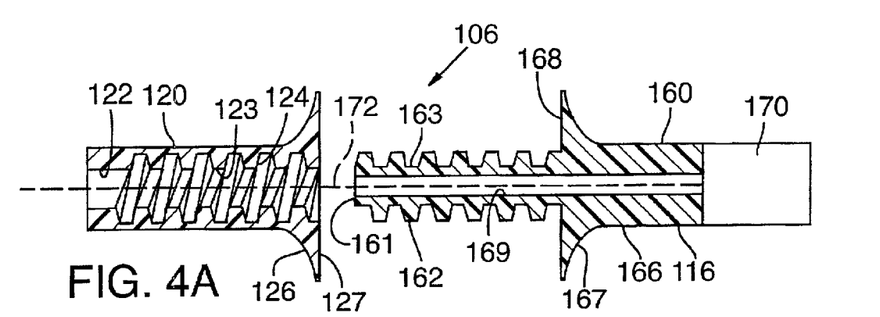
FIGS. 4A and 4B are partial cross-sectional side exploded and assembled views, respectively, of a location projector in accordance with an embodiment of the invention.
Figure 4B:
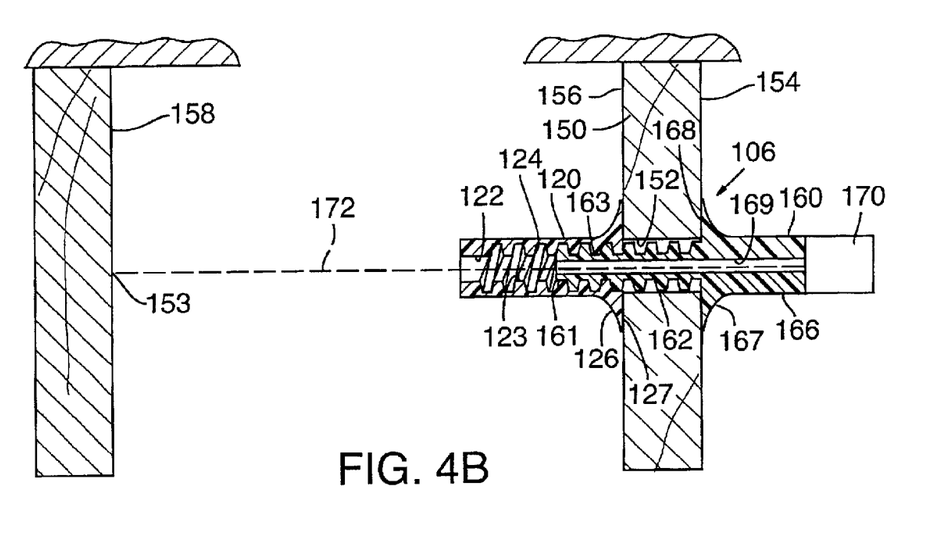

FIG. 4A is a partial cross-sectional exploded side view of a location projector 106 in accordance with an embodiment of the present invention. FIG. 4B is a partial cross-sectional side view of the location projector 106 in accordance with the method of using the embodiment of FIG. 4A. The location projector 106 is similar to the embodiment of FIGS. 1A and 1B but that the laser projector 170 is a removable component of the location projector 106. The location projector 106 comprises a first portion 160 and a second portion 120. The second portion 120 is essentially the same as the previous embodiments and used in essentially the same way as the previous embodiments.

The first portion 160 comprises a cylindrical first end 161 having helical external threads 162. The first end 161 is adapted to be inserted into the first through bore 152 from the first side 154 of the first support member 150. At least a portion 163 of the first end 161 extends beyond the opposite side 156 of the first support member 150. The first portion 160 further comprises a second end 166 having a first enlarged portion 167 adapted to prevent the second end 166 from entering the first through bore 152. The first enlarged portion 167 comprises a flat first contact surface 168. The first portion 160 further comprises a first portion through bore 169 between the first end 161 and the second end 166. The first portion 160 and the second portion 120 are adapted such that the first portion through bore 169 and the second portion through bore 122 are in substantially coaxial alignment with each other when assembled.

The first and second portions 160, 120 are assembled onto the support member 150 in much the same way as the embodiment of FIG. 1B. The second end 166 of the first portion 160 is adapted to couple with a laser projector 170. The laser projector 170 is coupled to the second end 166 such that the light beam 172 projects down the first portion through bore 169 and passes through the second portion through bore 122.

Figure 5:
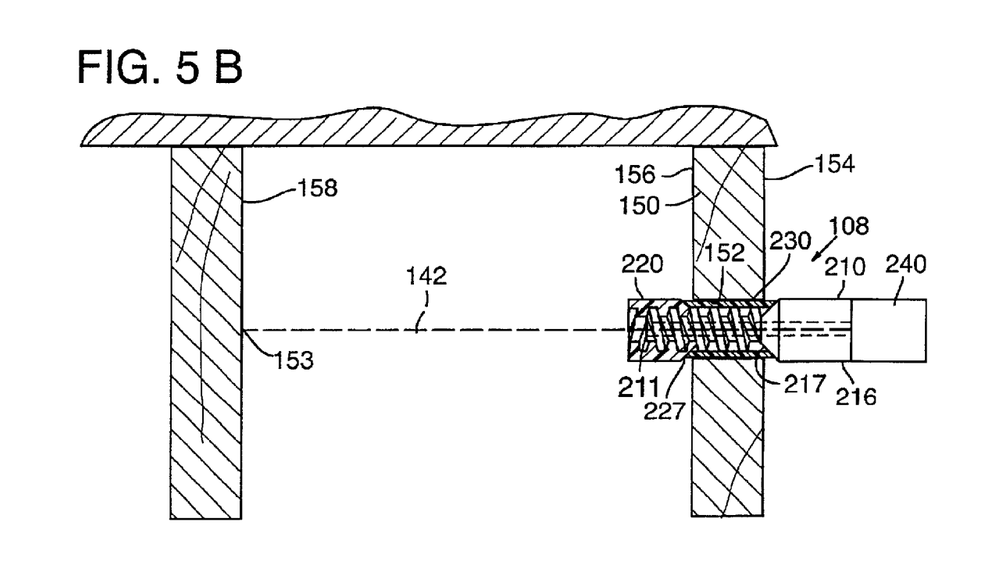
FIGS. 5A and 5B are partial cross-sectional side exploded and assembled views, respectively, of a location projector in accordance with an embodiment of the invention.
Figure 5A:
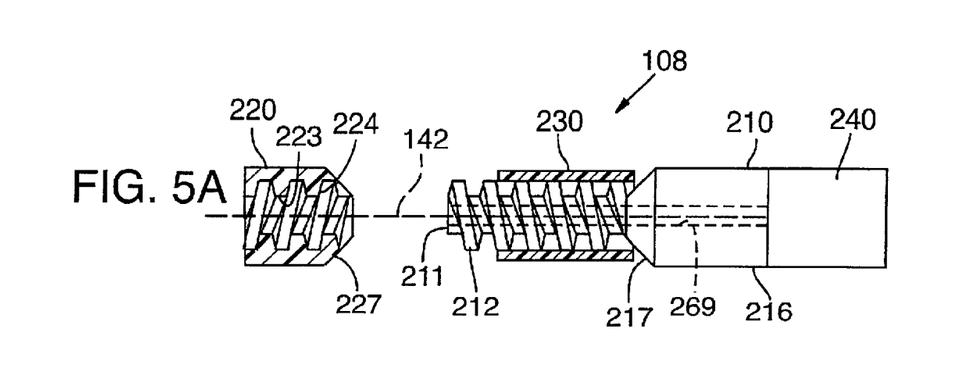

FIG. 5A is a partial cross-sectional side exploded view of a location projector 108 in accordance with another embodiment of the invention. The location projector 108 comprises a first portion 210 and a second portion 220. The first portion 210 comprises a first end 211, a second end 216 and a bore 269 between the first and second end 211, 216. The first end 211 comprises external helical threads 212. Proximal the first end 211 is a shoulder 217. In one embodiment of the invention, the shoulder 217 is tapered.

The second portion 220 comprises a helical threaded through bore 224 adapted to accept the first end 211 of the first portion 210. The second portion 220 further comprises a sleeve-bearing end 227 that, in one embodiment, is tapered. The location projector 108 further comprises a cylindrical sleeve 230 that is adapted to be compressible. The sleeve 230 is substantially the same as sleeve 130 shown in the embodiment of FIGS. 2A and 2B.

FIG. 5B is a partial cross-sectional side view of the location projector 108 in accordance with an embodiment of the method of using the present invention of FIG. 5A. A first through bore 152 is measured and produced in a first support member 150 using conventional methods. The sleeve 230 is sized to adapt the diameter of the first end 211 and the diameter of the first through bore 152 such that the location projector 108 will be substantially centered and restricted from shifting within the first through bore 152. That is, the interior diameter of the sleeve 230 is substantially the same as the diameter of the first end 211, and the exterior diameter of the sleeve 230 is substantially the same as the diameter of the first through bore 152.

The sleeve 230 is adapted to be compressible. The sleeve 230 has a length greater than the depth of the first through bore 152. The sleeve 230 is advanced over the first end 211 with an end abutting the shoulder 217. The first end 211 and the sleeve 230 are inserted into the first through bore 152. The second portion 220 is threaded onto the first end 211 and advanced such that the sleeve-bearing end 227 abuts the sleeve 230.

Upon further advancement of the second portion 220, the sleeve 230 is confined between the sleeve-bearing end 227 and the shoulder 217 causing the sleeve 230 to compress lengthwise and expand and/or increase in diameter. The sleeve 230 is adapted to radially expand against at least a portion of the inside surface of the first through bore 152. The sleeve 230 bears against the inside of the first through bore 152 and against the first end 211 securing and centering the location projector 108 inside the first through bore 152.

An illuminating source, such as a laser projector 240, is coupled to the second end 216 of the first portion 210 in substantially the same method shown in FIG. 4B. The location projector 108 is thereafter used in substantially the same way as previously described in previous embodiments.

In the previous embodiments, the location projector is used to locate positions on joists and the like to produce aligned through holes. In other applications, it is desired to attach conduit and the like from either below the support members or vertically along a support member. The location projector of the present invention can be used to locate positions on one or more support members from which to attach hangers and the like to support conduit, plumbing, and other like materials used in building construction.

Figure 6:
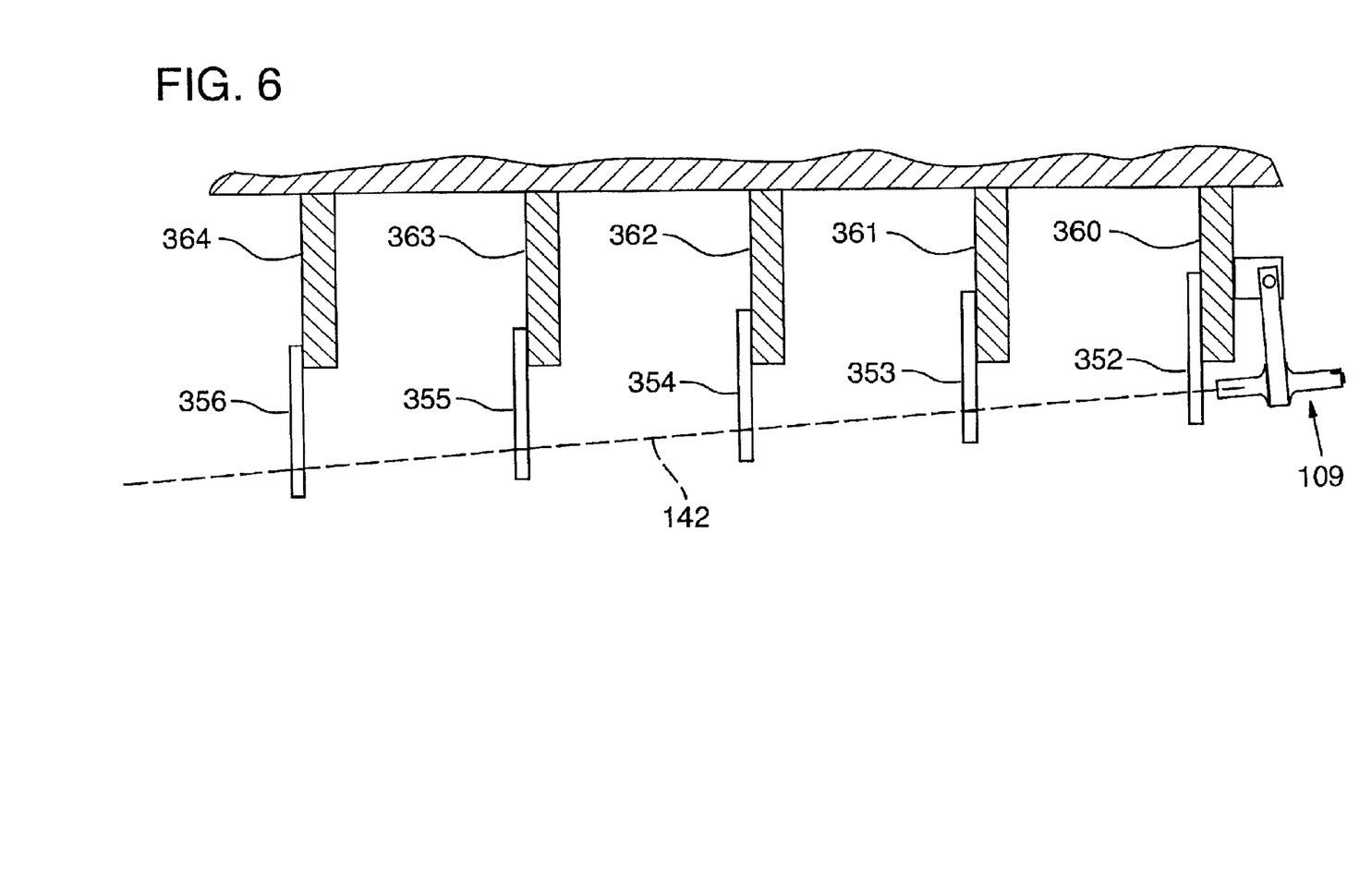
FIG. 6 is a side view of an embodiment of a location projector being used in accordance with an embodiment of a method of the present invention.

FIG. 6 is a side view of an embodiment of a location projector 109 in accordance with an embodiment of the method of the present invention. The location projector 109 is used to locate positions along a series of support members from which to attach hangers. The hangers, for example, J-hooks, are aligned in order to properly support the construction material. The embodiment of FIG. 6 illustrates an application wherein it is desired to support the construction material, such as a drainage pipe, in a downwardly sloping configuration.

In an embodiment of the method, a first hanger 352 is attached to a first support member 360, the location of which having been previously measured using conventional methods. The location projector 109 is securely coupled to the first hanger 352 using one of the methods described above or by other methods suitable for the intended purpose. The location projector 109 is used to project a light beam 142 which is used to locate the desired position of subsequent hangers 353–356 from subsequent support members 361–364, respectively.

As described in previous embodiments, the light beam 142 may be adjusted in a desired elevation suitable for a particular purpose. In an embodiment of a method in accordance with the present invention, the light beam 142 is adjusted in a horizontal orientation to locate hanger positions that will result in a horizontal run for conduit or the like. In another embodiment of the method, the light beam 142 is adjusted in a direction away from horizontal, to assist in locating hangers for applications requiring a sloping run, such as drainage plumbing.

The desired location of the hangers 353–356 may be determined in a number of ways. In an embodiment in accordance with a method of the invention, smoke is used to illuminate the light beam 142 to locate the desired hanger location with respect to the light beam 142 and the support members. In another embodiment of the method, the light beam 142 may be used to illuminate an opaque surface, such as a paper card, one's hand, or the hanger itself, to determine the desired hanger location upon each support member. Once the hanger location is determined, the hanger may be secured to the support member.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the construction arts will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An instrument for enabling the placement of axially aligned supports on multiple spaced apart support members in a building structure comprising:
   a first body portion and a second body portion;
   the first and second body portions adapted to be coupled together through a first support on a first support member, and, as coupled, to be securely clamped to the support;
   a light beam projector housed within one of the first and second body portions and projecting a light beam along a defined axis and toward one or more other spaced apart support members for sequentially determining desired support positions along the multiple of spaced apart support members.

2. The instrument of claim 1, wherein the supports are through bores and the first and second body portions are adapted to be coupled together through a first through bore from opposite sides of a first support member, and, as coupled, to be securely clamped to the support member.

3. The instrument of claim 2, wherein the first portion comprises a first end and a second end, the first end adapted to be inserted into the first through bore of the first support member, the first end adapted to be coupled to the second portion, the first and second portions further comprising opposing flange surfaces adapted to provide clamping pressure to the support member held between the opposing flanges.

4. The instrument of claim 3, wherein the first end comprises helical threads adapted to couple with helical threads in a bore of the second portion.

5. The instrument of claim 2, further comprising a cylindrical sleeve, the sleeve adapted to be inserted into the through bore and to accept the first end enabling a close fit between the first end and the through bore.

6. The instrument of claim 5, wherein the sleeve is compressible.

7. The instrument of claim 1, further comprising:
a bubble level aligned with the axis of the light beam, the bubble level adapted to provide a visual indication of the horizontal condition of the axis of the light beam.

8. The instrument of claim 1, further comprising:
a bulls-eye bubble level aligned with the axis of the light beam, the bulls-eye level adapted to provide a visual indication of the vertical condition of an axis of the light beam.

9. The instrument of claim 2, further comprising a through bore adapter enabling a close fit between the first end and the through bore, the through bore adapter adapted to be inserted into the through bore and to accept the first end.

10. The instrument of claim 9, wherein the through bore adapter comprises a cylindrical end adapted to be inserted into the through bore and a flanged end adapted to lie outside of the through bore and adjacent a surface of the first support member, the through bore adapter further comprising an adapter bore adapted to accept the first end therethrough.

11. The instrument of claim 1, wherein the axis of the light beam is adapted to be repositioned with respect to the first portion.

12. The apparatus of claim 1, wherein the supports are hangers and the first and second body portions are adapted to be coupled together through a first hanger on a first support member, and, as coupled, to be securely clamped to the first hanger.

13. A method for producing aligned supports in spaced-apart support members, comprising:
producing a first support in a first support member;
coupling an instrument to the first support, the instrument comprising:
a first body portion and a second body portion; the first and second body portions adapted to be coupled together through the first support and, as coupled, to be securely clamped to the support; and
a light beam projector housed within one of the first and second body portions and adapted to project a light beam along a defined axis;
projecting the light beam to illuminate a position on a second support member which is in the desired alignment with the first support; and
producing a support in one or more additional support members at the position illuminated by the light beam.

14. The method of claim 13, wherein:
producing a first support in a first support member comprises producing a first through bore in the first support member; and
coupling an instrument to the first support comprises inserting the first end of the first portion into the first through bore and coupling the second portion onto a protruding portion of the first end wherein the first and second portions are in clamping engagement with the support member.

15. An instrument for enabling aligned positioning of multiple conduit holders at spaced apart locations along a determined axis in a building structure comprising:
a body portion and a coupler for rigidly coupling the body portion to the building structure substantially along said axis, a light beam projector mounted in said body portion and adapted for projecting a light beam along said determined axis, and adjusting apparatus for adjusting the projection of the light beam to the precise axis following said rigid coupling and thereby enabling the determination of the axis at the spaced apart locations.

16. An instrument for enabling the boring of axially aligned holes in multiple spaced apart support members in a building structure comprising:
a first body portion and a second body portion;
said first and second body portions adapted to be coupled together through a through bore in a support member and as coupled to be securely clamped to the support member;
a light beam projector housed within one of the first and second body portions and projecting a light beam along a defined axis and toward multiple of other spaced apart support members for sequentially determining desired through bore positions along the multiple of spaced apart support members.

17. An instrument as defined in claim 16 wherein at least one of said first and second body portions at an end to be secured to the support member is tapered and sized relative to the through bore whereby as clamped to the support member, the instrument is substantially centered and restricted from shifting within the through bore.

* * * * *

UNITED STATES PATENT AND TRADEMARK OFFICE
CERTIFICATE OF CORRECTION

PATENT NO. : 6,857,193 B2
APPLICATION NO. : 09/969747
DATED : February 22, 2005
INVENTOR(S) : Kallesen et al.

It is certified that error appears in the above-identified patent and that said Letters Patent is hereby corrected as shown below:

In the Drawings:
Fig. 1A, reference numeral "123" should be deleted;
Fig. 1B, reference numeral "123" should be deleted;
Fig. 2A, reference numeral "123" should be deleted;
Fig. 2B, reference numeral "123" should be deleted;
Fig. 3C, reference numeral "123" should be deleted;
Fig. 4A, reference numeral "123" should be deleted, reference numeral "170" should read --140--, and reference numeral "172" should read --142--;
Fig. 4B, reference numeral "123" should be deleted, reference numeral "170" should read --140--, and reference numeral "172" should read --142--; and
Fig. 5A, reference numeral "223" should be deleted.

In the Specification:
Col. 3, line 43, "154,156" should read --154, 156--;
Col. 3, line 48, "154,156" should read --154, 156--;
Col. 4, line 3, "...optics that is..." should read --...optics that are...--;
Col. 4, line 5, "…numerous method…" should read --...numerous methods...--;
Col. 4, line 25, "...bulls-eye..." should read --...bull's-eye...--;
Col. 4, line 26, "...bulls-eye..." should read --...bull's-eye...--;
Col. 4, line 29, "...bulls-eye..." should read --...bull's-eye...--;
Col. 4, line 30, "...110,120..." should read --...110, 120...--;
Col. 5, line 18, "...118,127..." should read --...118, 127...--;
Col. 5, line 27, "...second contact surface 126..." should read --...second contact surface 127...--;
Col. 5, line 40, "...154,156..." should read --...154, 156...--;
Col. 6, line 34, "...laser projector 170..." should read --...laser projector 140...--;
Col. 6, line 60, "...laser projector 170..." should read --...laser projector 140...--;
Col. 6, line 61, "...laser projector 170..." should read --...laser projector 140...--; and
Col. 6, line 62, "...light beam 172..." should read --... light beam 142...--.

UNITED STATES PATENT AND TRADEMARK OFFICE
CERTIFICATE OF CORRECTION

PATENT NO. : 6,857,193 B2
APPLICATION NO. : 09/969747
DATED : February 22, 2005
INVENTOR(S) : Kallesen et al.

It is certified that error appears in the above-identified patent and that said Letters Patent is hereby corrected as shown below:

In the Claims:
Col. 9, line 21, "...bulls-eye..." should read --...bull's-eye...--;
Col. 9, line 22, "...bulls-eye..." should read --...bull's-eye...--; and
Col. 9, line 48, "...portion; the first..." should read --...portion; [New Line] the first...--.

Signed and Sealed this

Thirtieth Day of October, 2007

JON W. DUDAS
*Director of the United States Patent and Trademark Office*